(12) United States Patent
Card

(10) Patent No.: US 8,713,235 B2
(45) Date of Patent: Apr. 29, 2014

(54) LOW LATENCY INTERRUPT COLLECTOR

(75) Inventor: Robert A. Card, Scarborough, ME (US)

(73) Assignee: Fairchild Semiconductor Corporation, San Jose, CA (US)

(*) Notice: Subject to any disclaimer, the term of this patent is extended or adjusted under 35 U.S.C. 154(b) by 240 days.

(21) Appl. No.: 13/098,898

(22) Filed: May 2, 2011

(65) Prior Publication Data
US 2012/0284442 A1 Nov. 8, 2012

(51) Int. Cl.
G06F 13/24 (2006.01)
(52) U.S. Cl.
USPC .......................................... 710/260
(58) Field of Classification Search
USPC ................................ 710/260–269
See application file for complete search history.

(56) References Cited

U.S. PATENT DOCUMENTS 5,381,552 A * 1/1995 Dahlberg et al. ............. 710/264
5,568,649 A * 10/1996 MacDonald et al. ........... 710/48
6,021,456 A * 2/2000 Herdeg et al. ................. 710/260
2002/0091891 A1* 7/2002 Duncan et al. ................ 710/311
2006/0067156 A1* 3/2006 Ruckerbauer et al. ........ 365/233
2007/0283067 A1* 12/2007 Patella .......................... 710/260
2010/0077399 A1* 3/2010 Plondke et al. ............... 718/103
2011/0106999 A1* 5/2011 Love ............................ 710/305

OTHER PUBLICATIONS

"Chinese Application Serial No. 201220186575.3, Office Action mailed Sep. 14, 2012", 3 pgs.
"Chinese Application Serial No. 201220186575.3, Response filed Oct. 26, 2012 to Offce Action mailed Sep. 14, 2012", 24 pgs.

* cited by examiner

Primary Examiner — Nimesh G Patel
(74) Attorney, Agent, or Firm — Schwegman Lundberg & Woessner, P.A.

(57) ABSTRACT

This document provides apparatus and methods for providing low latency response from a processor to the interrupts collected from peripheral devices. In an example, an apparatus can collect interrupt requests from a plurality of peripheral devices, and can communicate interrupt information to a processor. Certain examples can reduce the quantity of processor general purpose inputs and outputs configured to receive the peripheral device interrupts in comparison to systems where the peripheral device interrupts are directly coupled to the processor.

12 Claims, 3 Drawing Sheets

LOW LATENCY INTERRUPT COLLECTOR

BACKGROUND

Miniaturization of electronics and improvements in signal processing and wireless communications have opened the world market place to a diverse range of mobile electronics that can provide a variety mobile communication, entertainment, and utility functions. Such devices often include a main processor and one or more other peripheral devices, such as sensors or transducers, that assist in providing the communication, or entertainment, or utility functions. Each peripheral device often requires the use of one or more general purpose inputs and/or outputs (I/O) of the main processor to communicate information about peripheral device status, such as, in the case of a sensor, the sensed information. In some applications, the cost and/or ability of a mobile electronic device to provide certain communication, entertainment, or utility functions can be driven by the availability of general purpose I/O on the main processor.

In certain examples, interrupts can be handled without using any processor general purpose I/O. Such an example can use a communication bus to poll the peripheral devices and service a peripheral device if an interrupt type condition exists. Although this type of system would reduce the number of general purpose I/O dedicated to receiving interrupts of the peripheral devices, interrupt latency, the time interval between the onset of the interrupt condition and the processor servicing the condition, can be unpredictable or unacceptable. Interrupt latency in such an example can depend on the speed of the communication bus and the number of peripheral devices polled. If such latency is too long, applications that depend on timely information from the peripheral devices may not be practical or provide useful utility.

Using processor general purpose I/O can provide very low latency intervals. However, availability of such general purpose I/O can limit the number of available peripheral devices provided or can drive the cost of a highly equipped system higher than the market can bear.

Overview

In certain examples, apparatus and methods disclosed herein can provide low latency response from a processor to a number of peripheral device interrupts. Certain examples can reduce the quantity of processor general purpose inputs and outputs configured to receive the peripheral device interrupts in comparison to systems where the peripheral device interrupts can be directly coupled to the processor.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Electronic devices can be configured to run an ever expanding variety of applications. Certain applications depend on the electronic device having one or more particular peripheral devices, such as sensors, displays, transducers, etc. The peripheral devices can interrupt the operation of the electronic device processor to provide information to the processor. In certain examples, each peripheral device can exchange information with the electronic device processor using one or more general purpose I/Os of the electronic device processor. Such an interface can usually have a low latency interval between the time a peripheral device can provide or request new information and the time the processor is ready to accept or provide the new information. However, availability of such general purpose I/O can limit the number of available peripheral devices provided with a system or can drive the cost of a highly equipped system higher than the market can bear.

The present inventor has recognized, among other things, that adding peripheral devices to interface with a device processor can limit the performance of the device, can add cost to the device, or can be difficult or prohibitive if additional general purpose inputs and/or outputs are not available on the processor. In various examples, these issues can be solved using low latency interrupt collectors that can allow one or more additional peripheral devices to interface with a device processor without consuming additional general purpose I/O and without significantly increasing latency of the processor in response to an interrupt received from a peripheral device.

The present inventor has also recognized, among other things, that the ability or cost to provide communication, including wireless communications, entertainment, or utility functions using an electronic device, can be related to many factors including the number of general purpose I/O available on a processor of the electronic device and the latency associated with servicing the peripheral devices used with the processor. Such peripheral devices can include, but are not limited to, multi- and single axis accelerometers, an electronic compass, a gyroscope, an ambient light sensor, a proximity sensor, a touchscreen, acoustic transducers, global positioning sensing devices, etc. This document provides apparatus and methods to collect interrupt requests from two or more peripheral devices, to interrupt an associated device processor, and to provide the processor with enough information to quickly service each interrupt. In addition, in certain examples, the apparatus and methods disclosed herein can accomplish the above functions using about the same amount of general purpose I/O employed for a single peripheral device directly coupled to an electronic device processor.

Figure 1:
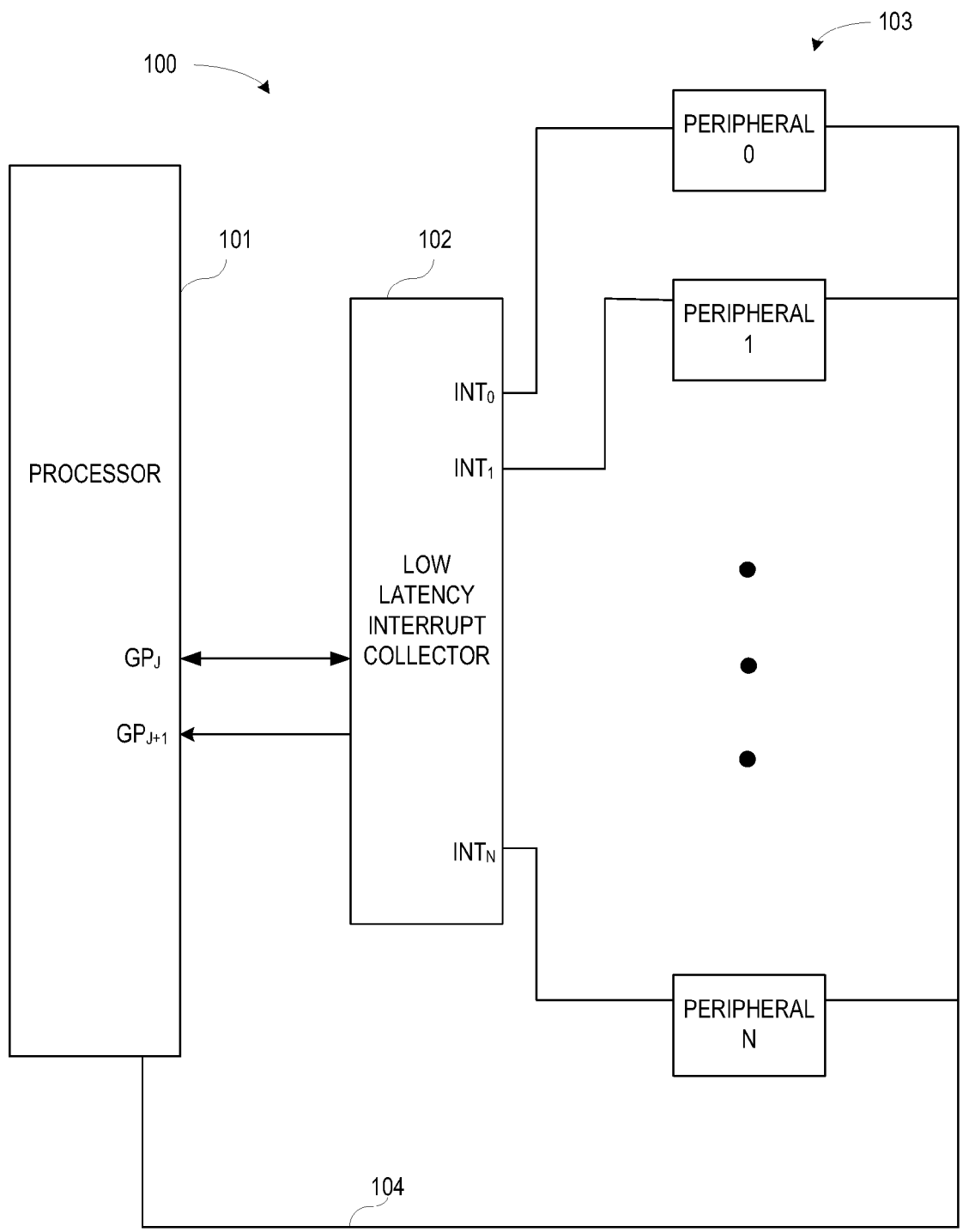
FIG. 1 illustrates generally an example system for reducing the number of processor general purpose I/O employed to service a plurality of peripheral devices.

FIG. 1 illustrates generally an example of a system 100 for reducing the number of processor general purpose I/Os employed to service a plurality of peripheral devices. In an example, the system 100 can include a processor 101, a low latency interrupt collector (LLIC) 102, and a number of peripheral devices 103. In certain examples, the processor 101 can include a microprocessor, a micro controller, a processor for a portable electronic device (such as a portable media player, a personal digital assistant, or a baseband processor for a cell phone), or one or more other processors. The LLIC 102 can receive interrupt requests from the plurality of peripheral devices 103 and communicate interrupt information to the processor 101 using only a few general purpose I/O. In certain examples, the interrupt information can include a value corresponding to the identity of the requesting peripheral.

In an example, the interrupt request information from a plurality of the peripheral devices 103 can be exchanged between the LLIC 102 and the processor 101 using two general purpose inputs and one general purpose output of the processor 101. In other examples, the interrupt request information from a plurality of the peripheral devices 103 can be exchanged between the LLIC 102 and the processor 101 using one bi-direction general purpose I/O ($GP_j$) and one general purpose input ($GP_{j+1}$), of the processor 101. In certain examples, the processor 101 can exchange information with each peripheral device, such as when a particular device provides an interrupt request, using a communication bus architecture 104 coupled between the processor 101 and each of the peripheral devices 103. Examples of the communication bus architecture 104 can include, but are not limited to, inter-integrated circuit ($I^2C$) bus architecture and system management bus (SMB) architecture.

Figure 2:
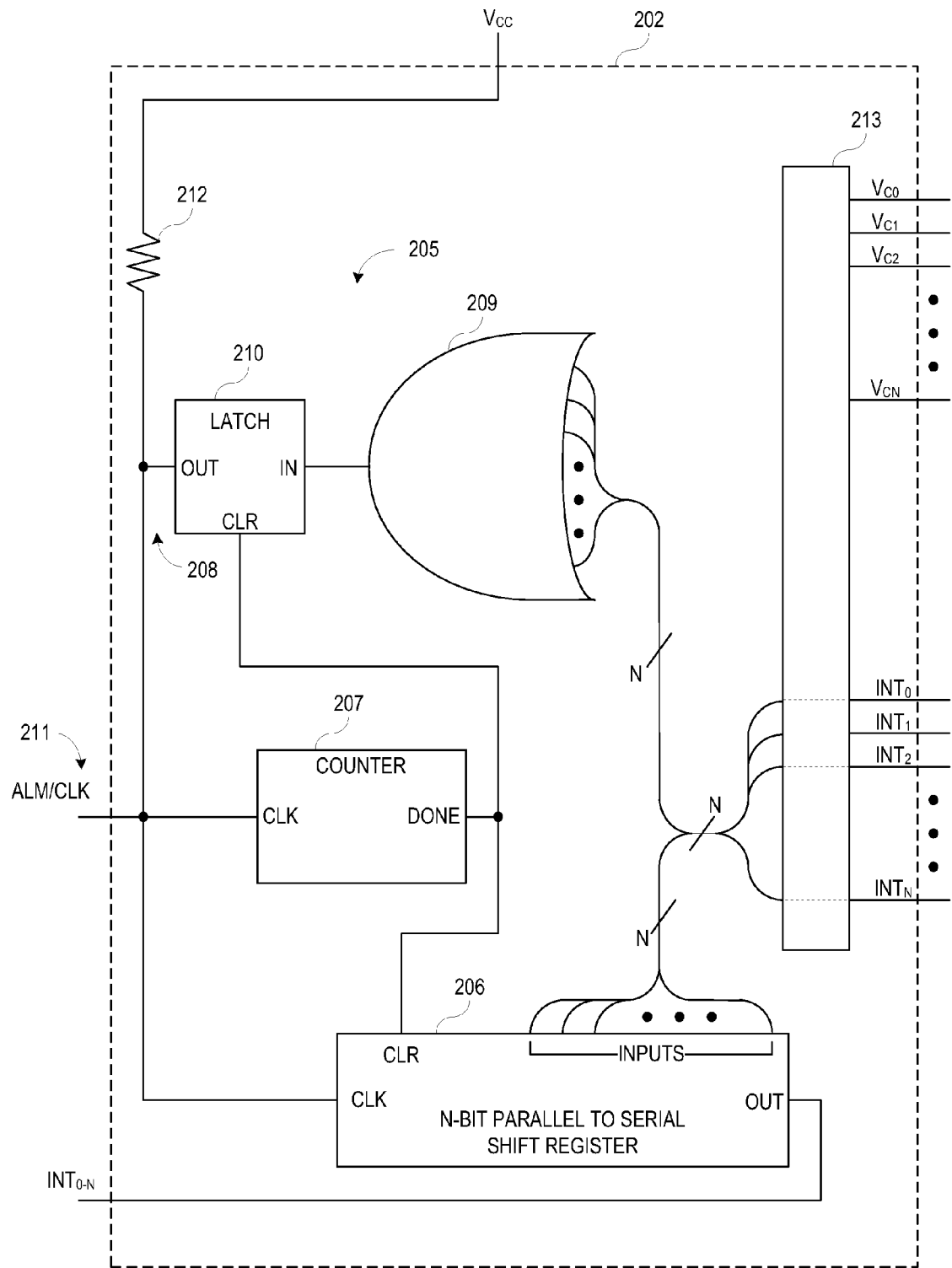
FIG. 2 illustrates generally an example low latency interrupt collector.

FIG. 2 illustrates generally an example of a low latency interrupt collector (LLIC) 202. The LLIC 202 can be used to reduce the number of general purpose I/O employed to interface a plurality of peripheral devices to a processor, such as a baseband processor of a cell phone, for example. The LLIC 202 can include a number of interrupt request inputs ($INT_0$, $INT_1$, ..., $INT_N$), logic 205, inputs and outputs, ALM/CLK, $INT_{0-N}$, a parallel-to-serial converter 206, and a counter 207.

In an example, the LLIC 202 can include a number of inputs ($INT_0$, $INT_1$, ..., $INT_N$) configured to receive interrupt request signals from a number of peripheral devices. The peripheral devices can include, but are not limited to, multi- and single axis accelerometers, an electronic compass, a gyroscope, an ambient light sensor, a proximity sensor, a touchscreen, acoustic transducers, global position sensing devices, etc. Applications configured to run on electronic devices, such as cell phones, personal media players, personal digital assistants, or one or more other electronic devices can use peripheral devices to interact with a user, to control the execution of the application, or to provide information or feedback to the application. A peripheral device can issue an interrupt request when the status of the peripheral device has changed to a certain degree, or after a period of time. The interrupt can be used to signal a processor to exchange information with the peripheral device. In certain examples, issuing an interrupt can save processing power because the processor need only exchange information with the peripheral device when the peripheral device can provide or can receive new information, thus, the processor is not burdened with communicating with the peripheral device when peripheral information has not changed.

In an example, the logic 205 can detect one or more changes in the status of the interrupt request inputs ($INT_0$, $INT_1$, ..., $INT_N$). In an example, the logic 205 can provide an output 208 indicative of a change in received interrupt requests. In some examples, the output 208 indicates one or more interrupt requests transitioning from an inactive state to an active state. In an example, where an interrupt request transitions from a low logic level when inactive to a high logic level when active, the logic can include an "or" gate 209 coupled to the plurality of inputs. It is understood that other logic circuits are possible to indicate one or more interrupt requests transitioning from an inactive state to an active state without departing from the scope of the present subject matter. In an example, the logic 205 can include a latch 210 configured to hold an output indicative of a momentary state of the "or" gate, for example, until interrupt information can be passed to the processor. In an example, where one or more interrupt requests are signaled using a pulse, the latch 210 can hold the output 208 at an active level until the interrupt information is passed to the processor. The output 208 can be coupled to an input of the processor to indicate to the processor when one or more interrupt requests from the plurality of peripheral devices are active.

In certain examples, the serial-to-parallel converter 206 can receive a request for interrupt information from the processor at an input (CLK) and provide the interrupt information at an output (OUT). In an example, upon receiving an indication that an interrupt is active, the processor can provide a series of clock signals to the serial-to-parallel converter 206. In an example, on each clock signal, the parallel-to-serial converter 206 can shift and provide at the output (OUT), in sequence, a bit indicative of the status of one of the plurality of interrupt requests.

For example, if N interrupts can be received by the LLIC 202, upon receiving N clock signals, such as clock pulses or clock transitions, the parallel-to-serial converter 206 can shift and sequentially output the status of each of the N interrupt request inputs ($INT_0$, $INT_1$, ..., $INT_N$) to an output ($INT_{0-N}$) of the LLIC 202 coupled to a general purpose input of the processor. Upon receiving the N bits of interrupt information, the processor can identify which peripheral devices have active interrupts and can then service the interrupts using, for example, a communication bus coupled to the peripheral devices.

In certain examples, an interrupt request can be received as a pulse. The parallel-to-serial converter 206 can be configured such that each pulse interrupt is latched within the parallel-to-serial converter 206. After the interrupt information is shifted out of the parallel-to-serial converter 206, the parallel-to-serial converter 206 can receive reset information at an input (CLR) and can reset a register to capture each subsequent interrupt request pulse from the peripheral devices. In an example, the logic level captured by the LLIC 202 as an active interrupt request can be programmable.

In certain examples, the LLIC 202 can include a counter 207. The counter 207 can receive the interrupt information request clock signal at an input (CLK). Upon receiving, for example, N clock signals, the counter 207 can provide reset information at an output (DONE) coupled to at least one of the parallel-to-serial converter 206 or the latch 210, so as each can capture subsequent interrupt requests from the peripheral devices.

In certain examples, the LLIC 202 can include an ALM/CLK bidirectional port 211 configured to provide an indication, or interrupt alarm (ALM), related to the status of the plurality of interrupt requests to the processor, and to receive the interrupt information request from the processor, such as a clock signal (CLK). In an example, upon being cleared, the output 208 can be allowed to float and thus be pulled to a high logic level, (e.g., Vcc such as by a pull-up resistor 212) indicating that there are no active interrupt requests. Upon receiving an interrupt request, the latch 210 can pull the latch output (OUT) low (e.g., weakly). The low logic level at the ALM/CLK bi-direction port 211 can indicate to the processor that a peripheral device is ready to communicate. The processor can control (e.g., strongly) the logic level of the ALM/CLK bi-directional port 211 to provide an interrupt information request to the LLIC 202, such as in the form of clock signals, for example. After providing N clock signals, the counter 207 can provide reset information to the latch 210 and the ALM/CLK bi-direction port 211 can be pulled to a high logic level until a subsequent active interrupt request is received.

In an alternative example, upon being cleared, the output 208 can be pulled to a low logic level using the latch 210, indicating that there are no active interrupt requests. Upon receiving an interrupt request, the latch 210 can let the latch output (OUT) float. The ALM/CLK bi-direction port 211 of the LLIC 202 can be pulled high using a pull-up resistor 212 coupled to the output 208. The high logic level at the ALM/CLK bi-direction port 211 can indicate to the processor that a peripheral device is ready to communicate with the processor. The processor can control the logic level of the ALM/CLK bi-directional port 211 to provide an interrupt information request to the LLIC 202, such as in the form of clock signals, for example. After providing N clock signals, the counter 207 can provide reset information to the latch 210 and the ALM/CLK bi-direction port 211 can be pulled low until a subsequent active interrupt request is received.

In an example, an LLIC 202 can be configured to receive up to eight interrupt requests from up to eight peripheral devices. In such an example, the LLIC 202 can sequentially communicate eight bits to provide the interrupt information to the processor. Upon receiving the eight clock cycles from the processor, the counter 207 can reset the parallel-to-serial converter 206 and the latch 210. In other examples, the LLIC 202 can be configured to receive other numbers of interrupt requests from other numbers of peripheral devices (e.g., more than eight).

In certain examples, the LLIC 202 can include a level shift circuit 213 that can also be referred to as a translator circuit. The level shift circuit 213 can translate one or more interrupt request logic levels to the logic level of the LLIC 202. In an example, the level shift circuit 213 can include one or more voltage inputs ($V_{C0}, V_{C1}, V_{C2}, \ldots, V_{CN}$). Each voltage input ($V_{C0}, V_{C1}, V_{C2}, \ldots, V_{CN}$) can be associated with one or more of the interrupt request inputs ($INT_0, INT_1, \ldots, INT_N$). In an example, an interrupt request signal of a first peripheral device can be received at $INT_1$ and a voltage indicative of a high interrupt logic level of the first peripheral device can be received at $V_{C1}$. The level shift circuit 213 can translate the high logic level of the received interrupt request to the high logic level of the logic 205 or the parallel-to-serial shift register 206. In a further example, an interrupt request of a second peripheral device can be received at $INT_2$ and a voltage indicative of a high logic level of the second peripheral device can be received at $V_{C2}$. The level shift circuit 213 can translate the high logic levels of each of the received interrupt requests to the high logic level of the logic 205 or the parallel-to-serial shift register 206, even if the high logic level of the first peripheral device is different than the high logic level of the second peripheral device. In an example, each interrupt request input ($INT_0, INT_1, \ldots, INT_N$) can be associated with a level shift circuit voltage input ($V_{C0}, V_{C1}, V_{C2}, \ldots, V_{CN}$). In an example, more than one interrupt request input ($INT_0, INT_1, \ldots, INT_N$) can be associated to a particular level shift circuit voltage input ($V_{C0}, V_{C1}, V_{C2}, \ldots, V_{CN}$).

Figure 3:
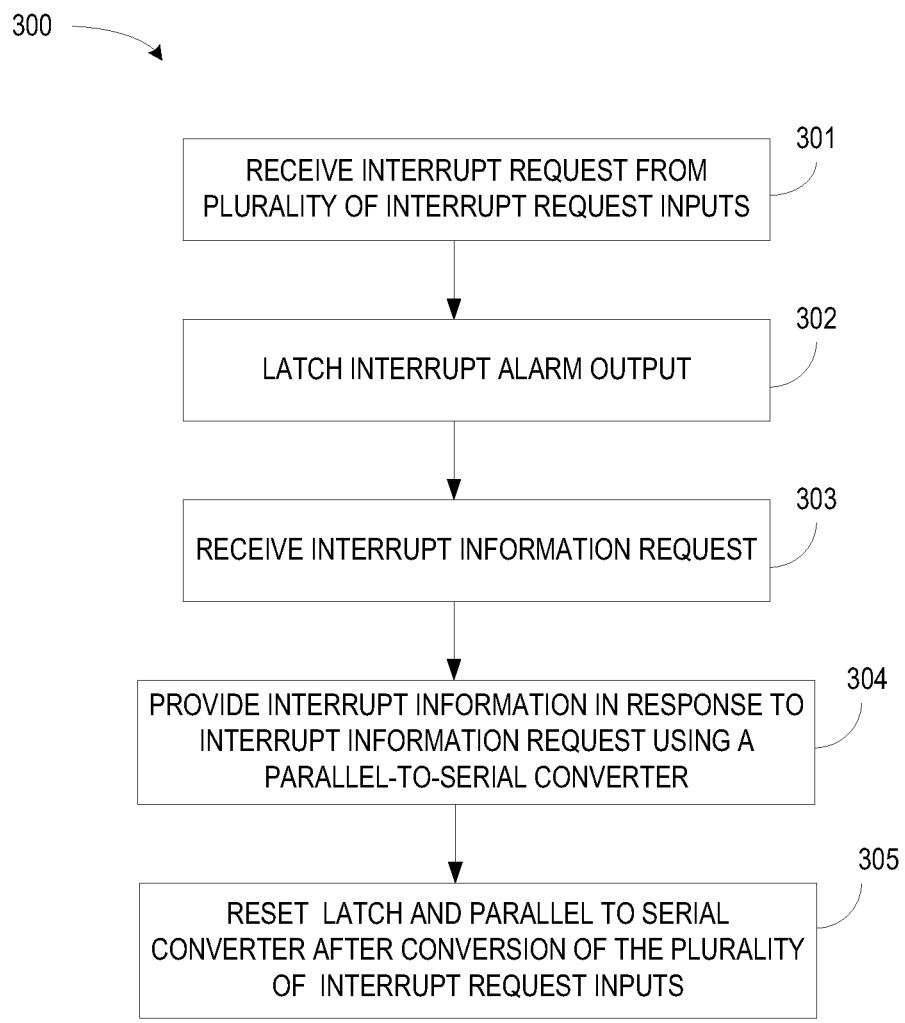
FIG. 3 illustrates generally an example method for operating a low latency interrupt collector to reduce the use of processor general purpose I/O for receiving peripheral device interrupts.

FIG. 3 illustrates generally an example of a method 300 for operating a low latency interrupt collector to reduce the use of processor general purpose I/O for receiving peripheral device interrupts.

At 301, one or more interrupt requests from a plurality of interrupt request inputs of a low latency interrupt collector can be received. In an example, more than one interrupts can be received simultaneously at the interrupt request inputs. In an example, the interrupt request inputs can be coupled to one or more peripheral devices.

At 302, a latch can latch an interrupt alarm output in response to one or more interrupt requests. In an example, the interrupt alarm is coupled to an input of a processor, such as a baseband processor.

At 303, the low latency interrupt collector can receive a request to provide interrupt information. In an example, the interrupt information request can come from a processor, such as the processor receiving the interrupt alarm. In an example, the interrupt information request can be received on a bi-direction port configured to also provide the interrupt alarm to the processor.

At 304, the low latency interrupt collector can provide interrupt information in response to the interrupt information request. In an example, providing the interrupt information can include converting a status of the plurality of interrupt request inputs to a serial output of interrupt information using a parallel-to-serial converter. In an example, the interrupt information can be used to identify one or more peripheral devices with active interrupt requests. In an example, receiving the interrupt information request can include receiving clock signals from the processor. In an example, providing the interrupt information can include counting the clock signals using a counter. In an example, the counter can provide reset information after receiving a predetermined threshold number of count signals. In an example, the predetermined threshold number of count signals can correspond to number of interrupt request inputs in the plurality of interrupt request inputs.

At 305, the latch and parallel-to-serial converter can be reset, for example, using reset information received from the counter.

In certain examples, a processor receiving the interrupt information can use the information to identify peripheral devices having an active interrupt. In certain examples, the processor can communicate with one or more of the peripheral devices over a communication bus to service the active interrupt requests. In certain examples, servicing an interrupt request can include exchanging information with a peripheral device, such as, but not limited to, receiving sensor information from the peripheral device, setting parameters of the peripheral device, or receiving sensor information from the peripheral device and setting parameters of the peripheral device.

Additional Notes

In Example 1, a system can include a mobile device processor, a plurality of peripheral devices, a plurality of inputs configured to simultaneously receive a plurality of interrupt requests from the plurality of peripheral devices, and control logic configured to provide an indication of at least one interrupt request received at the plurality of inputs to the mobile device processor and to provide interrupt information to the mobile device processor in response to a request from the mobile device processor. The system can be configured to reduce an overall number of general purpose inputs and outputs of a mobile device processor configured to receive peripheral device interrupts.

In example 2, the system of Example 1 optionally include a communication bus configured to provide communication between the mobile device processor and the plurality of peripheral devices.

In Example 3, the mobile device processor of any one or more of Examples 1-2 optionally includes a baseband processor for a wireless communication device.

In Example 4, the plurality of peripheral devices any one or more of Examples 1-3 optionally includes at least one of an accelerometer, an electronic compass, a gyroscope, an ambient light sensor, a proximity sensor, or a touchscreen.

In Example 5, the system of any one or more of Examples 1-4 optionally includes a bidirectional port configured to output the indication of the interrupt request.

In Example 6, the bidirectional port of any one or more of Examples 1-5 is optionally configured to receive the request from the mobile device processor, and the control logic is optionally configured to provide a value of the at least one interrupt request to the mobile device processor using an output.

In Example 7, an apparatus can include a plurality of inputs configured to simultaneously receive a plurality of interrupt requests, and control logic configured to provide an indication of at least one interrupt request received at the plurality of inputs to a mobile device processor and to provide interrupt information to the mobile device processor in response to a request from the mobile device processor.

In Example 8, the apparatus of claim 7 optionally includes a bidirectional port configured to output the indication of the interrupt request.

In Example 9, the bidirectional port of any one or more of Examples 1-8 is optionally configured to receive the request from the mobile device processor, and the control logic is optionally configured to provide a value of the at least one interrupt request to the mobile device processor using an output.

In Example 10, the request from the mobile device processor of any one or more of Examples 1-9 optionally includes a clock signal, and the apparatus any one or more of Examples 1-9 optionally includes a converter configured to receive the clock signal and to sequentially shift the value of the at least one interrupt request to the mobile device processor using the output.

In Example 11, the apparatus of any one or more of Examples 1-10 optionally includes a counter configured to receive the clock signal, to increment in response to the clock signal, and to provide reset information to the converter after the counter reaches a predetermined threshold.

In Example 12, the control logic of any one or more of Examples 1-11 optionally includes an OR gate configured to receive the plurality of interrupt request.

In Example 13, the control logic of any one or more of Examples 1-12 is optionally configured to provide the indication of the at least one interrupt request to the mobile device processor using a bit signal, and the control logic of any one or more of Examples 1-12 optionally includes a latch configured to latch a state of the bit signal.

In Example 14, a method can include simultaneously receiving a plurality of interrupt requests, providing an indication of at least one interrupt request of the received plurality of interrupt requests to a mobile device processor, receiving an interrupt information request from the mobile device processor, providing the interrupt information to the mobile device processor in response to the interrupt information request; receiving a clock signal at the bidirectional port in response to the bit signal, and sequentially shifting a value of an interrupt request of the plurality of interrupt request to a output in response to the received clock signal using a converter.

In Example 15, the providing the indication of any one or more of Examples 1-14 optionally includes outputting the indication of the at least one interrupt request at a bidirectional port.

In Example 16, the receiving the interrupt information request of any one or more of Examples 1-15 optionally includes receiving the interrupt information request from the mobile device processor at the bidirectional port.

In Example 17, the receiving the interrupt information request of any one or more of Examples 1-16 optionally includes receiving a clock signal from the mobile device processor at the bidirectional port.

In Example 18, the receiving the interrupt information request of any one or more of Examples 1-17 optionally includes receiving the clock signal at a parallel-to-serial converter, and the method of any one or more of Examples 1-17 optionally includes sequentially shifting a value representative of the at least one interrupt request to the mobile device processor using an output.

In Example 19, the receiving the interrupt information request of any one or more of Examples 1-18 optionally includes incrementing a counter using the clock signal, and providing reset information to the converter after the counter reaches a predetermined threshold.

In Example 20, the simultaneously receiving a plurality of interrupt requests of any one or more of Examples 1-19 optionally includes simultaneously receiving a plurality of interrupt requests from a plurality of peripheral devices, and the method of any one or more of Examples 1-19 optionally includes servicing a peripheral device corresponding to the at least one interrupt request using a serial communication bus coupled to at least a plurality of the plurality of peripheral devices.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. In other examples, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A system configured to reduce an overall number of general purpose inputs and outputs of a mobile device processor configured to receive peripheral device interrupts, the system comprising:
a mobile device processor;
a plurality of peripheral devices;
a plurality of inputs configured to simultaneously receive a plurality of interrupt requests from the plurality of peripheral devices; and
control logic including a converter and a counter, the control logic configured to:
provide an indication of at least one interrupt request received at the plurality of inputs to the mobile device processor; and
provide interrupt information to the mobile device processor in response to a request from the mobile device processor,
wherein the request from the mobile device processor includes a predetermined number of pulses,
wherein the converter is configured to serially provide the interrupt information from the converter at an output in response to the request, and
wherein the counter is configured to increment in response to the request, and to provide reset information to the converter after the counter reaches a predetermined threshold.

2. The system of claim 1, including a communication bus configured to provide communication between the mobile device processor and the plurality of peripheral devices.

3. The system of claim 1, wherein the mobile device processor includes a baseband processor for a wireless communication device.

4. The system of claim 1, wherein the plurality of peripheral devices includes at least one of an accelerometer, an electronic compass, a gyroscope, an ambient light sensor, a proximity sensor, or a touchscreen.

5. The system of claim 1, including a bidirectional port configured to output the indication of the interrupt request.

6. The system of claim 5, wherein the bidirectional port is configured to receive the request from the mobile device processor; and
wherein the control logic is configured to provide a value of the at least one interrupt request to the mobile device processor using the output.

7. An apparatus comprising
a plurality of inputs configured to simultaneously receive a plurality of interrupt requests;
a bidirectional port configured to output an indication of an interrupt request and to receive a interrupt information request from a mobile device processor;
a converter configured to receive a clock signal of the interrupt information request;
a counter configured to receive the clock signal; and
control logic configured to:
provide the indication of the interrupt request to the mobile device processor; and
to provide interrupt information to the mobile device processor in response to the interrupt information request wherein the interrupt information includes a value of the interrupt request;
wherein the converter is configured to sequentially shift the value of the at least one interrupt request to the mobile device processor using an output; and
wherein the counter is configured to increment in response to the clock signal, and to provide reset information to the converter after the counter reaches a predetermined threshold.

8. The apparatus of claim 7, wherein the control logic includes an OR gate configured to receive the plurality of interrupt request.

9. The apparatus of claim 7, wherein the control logic is configured to provide the indication of the at least one interrupt request to the mobile device processor using a bit signal, and wherein the control logic includes a latch configured to latch a state of the bit signal.

10. A method comprising:
simultaneously receiving a plurality of interrupt requests;
outputting an indication of at least one interrupt request of the received plurality of interrupt requests to a mobile device processor using a bidirectional port;
receiving an interrupt information request from the mobile device processor at the bidirectional port; and
sequentially shifting a value of an interrupt request of the plurality of interrupt requests to an output in response to a clock signal of the interrupt information request using a parallel-to-serial converter;
incrementing a counter using the clock signal; and
providing reset information to the parallel-to-serial converter after the counter reaches a predetermined threshold.

11. The method of claim 10, wherein the receiving the interrupt information request includes receiving the interrupt information request from the mobile device processor at the bidirectional port.

12. The method of claim 10, wherein the simultaneously receiving a plurality of interrupt requests includes simultaneously receiving a plurality of interrupt requests from a plurality of peripheral devices; and wherein the method includes:
servicing a peripheral device corresponding to the at least one interrupt request using a serial communication bus coupled to at least a plurality of the plurality of peripheral devices.

* * * * *